(12) United States Patent
Baretzki

(10) Patent No.: US 7,050,443 B2
(45) Date of Patent: May 23, 2006

(54) DYNAMICALLY CONFIGURABLE DATA ROUTER

(75) Inventor: Laurent Baretzki, Issy les Moulineaux (FR)

(73) Assignee: Airsys ATM S.A., Bagneux (FR)

( * ) Notice: Subject to any disclaimer, the term of this patent is extended or adjusted under 35 U.S.C. 154(b) by 920 days.

(21) Appl. No.: 09/834,974

(22) Filed: Apr. 16, 2001

(65) Prior Publication Data
US 2002/0021664 A1 Feb. 21, 2002

(30) Foreign Application Priority Data
Apr. 18, 2000 (FR) .................................. 00 04984

(51) Int. Cl.
*H04L 12/28* (2006.01)

(52) U.S. Cl. .................. 370/400; 370/432; 370/395.31

(58) Field of Classification Search ........ 370/389–390, 370/392–393, 395.1, 395.31, 395.6, 400, 370/396, 395.4, 432, 468, 477
See application file for complete search history.

(56) References Cited

U.S. PATENT DOCUMENTS

| 6,081,507 A * | 6/2000 | Chao et al. ................. 370/235 |
| 6,380,869 B1 * | 4/2002 | Simon et al. ............... 340/945 |
| 6,751,191 B1 * | 6/2004 | Kanekar et al. ............ 370/217 |

FOREIGN PATENT DOCUMENTS

| EP | 1 039 761 A1 | 9/2000 |
| FR | 2 758 925 | 7/1998 |
| WO | WO 97/49214 | 12/1997 |
| WO | WO 00/30322 | 5/2000 |

* cited by examiner

*Primary Examiner*—Wellington Chin
*Assistant Examiner*—Mark A. Mais
(74) *Attorney, Agent, or Firm*—Oblon, Spivak, McClelland, Maier & Neustadt, P.C.

(57) ABSTRACT

The disclosure relates to a network router characterized in that it includes at least one generic router able to execute routings between inputs ($I_1, I_2, I_3, \ldots$) and outputs ($O_1, O_2, O_3, \ldots$), a configuration file including the parameters of a given set of routings between said inputs and outputs, and a routing table, a subset of routings ($R1, R2, \ldots$) being loaded from said configuration file into said routing table by said generic router to enable this router to execute the routings between said inputs and outputs according to the configuration defined in said routing table. The invention is notably applicable to the processing air traffic management data.

15 Claims, 5 Drawing Sheets

DYNAMICALLY CONFIGURABLE DATA ROUTER

BACKGROUND OF THE INVENTION

The invention concerns a data router that can be configured dynamically. It is notably applicable to the handling of air traffic data. More generally, it is applicable to all computer routing systems having large numbers of inputs and of outputs.

DESCRIPTION OF THE PRIOR ART

Air traffic density has reached a very high level, while air safety requirements are becoming increasingly stringent. Modern-day air traffic management therefore involves the processing of large quantities of data, notably used by air traffic controllers and pilots. These data include a broad range of radar data, meteorological data, aircraft positions and flight plans, and instrument landing system (ILS) data. The processing of all this information requires powerful computing means. Among these means, the interfaces with data centers and decision-makers are of particular importance. These interfacing means serve notably for information routing to ensure that data finds its way to the right destinations. Given the vary large volumes of data, the performance of these means is of vital importance in the global operation of an air traffic management system.

Commercially-available equipment exists with operating systems that can. satisfy these routing needs. For example, there is a range of products carrying the registered brand name "LINES", meaning "Link Interface Node for External Systems". These modular products are designed to enable routing and processing of input/output messages carried on incoming/outgoing serial links and Ethernet networks. Standard serial links, using protocols such as X25, HDLC and BSC for example, can be handled, as can dedicated lines, such as special radar data transmissions protocols.

These so-called routers can operate with a software architecture of frontal processor type. They are equipped with FPBSS-type software, meaning "Front Processor Basic System Software". In this operating mode, the router is connected to a single application program. It has only one upstream function, for example routing data to the required destination. The essential application software is stored in one or more central computers; one router is required for each application.

The performance of these routers can enhanced by using an open communication mode known as OCP (Open Communication Processor). In this mode, a router is connected to several applications and operates substantially as a data server. It is notably used to process and route the data from any input point to any output point. This operating mode is particularly suitable for air traffic management. In an air traffic management application, this mode notably provides the following functionalities:

- black-box-type distribution of radar data to the centers, the radar data being received via serial interfaces and transmitted via an Ethernet network to an identified group of machines; such distribution is known as "UDP multicast";
- autonomous conversion of messages or protocols, notably enabling conversion of message formats or specific protocols, for example ISR2 into ASTERIX, X25 into HDLC-UI, etc.;
- retransmission of radar data via serial lines to processing circuits.

A specific program must however be included in these routers operating in OCP mode to assure interfaces with all the inputs and outputs, to or from Ethernet or serial links. This specific program is linked to the application, for example air traffic management. However, this implies the development of a new routing and processing application:

- every time a new input and/or output must be configured, for example a TCP/IP or an asynchronous link;
- every time a specific routing must be activated, for example the routing of all incoming messages from asynchronous links to a TCP/IP connection;
- every time a dedicated program is required, for example removal of a "checksum" control on a message received on an asynchronous link before transmission to a TCP/IP connection.

The need to develop a new program for each of the aforementioned evolutions—and for every different need—seriously undermines the router's economic viability, threatens its reliability and complicates its maintenance. Consequently, this is not a good industrial solution.

SUMMARY OF THE INVENTION

The object of the present invention is therefore a cost-effective system in which a router satisfies a large variety of needs without requiring the development of specific routing and processing software.

For this purpose, the invention is a network router characterized in that it includes at least one generic router able to execute routings between inputs ($I_1, I_2, I_3, \ldots$) and outputs ($O_1, O_2, O_3, \ldots$), a configuration file including the parameters of a given set of routings between said inputs and outputs, and a routing table, a subset of routings (R1, R2, . . . ) being loaded from said configuration file into said routing table by said generic router to enable this router to execute the routings between said inputs and outputs according to the configuration defined in said routing table.

There is a specific subset of routings for each specific need. When it is started, the generic router activates the inputs and outputs dedicated to the application and loads the routing table.

The main advantages of the invention are that it adapts to numerous types of applications, that it enables handling of "overflows" at the outputs, and that it is easy to implement.

BRIEF DESCRIPTION OF THE DRAWINGS

Other characteristics and advantages of the invention will become clear on reading the following description of a preferred embodiment, taken only as a non-limitative example, making reference to the attached drawings of which.

DETAILED DESCRIPTION OF A PREFERRED EMBODIMENT

Figure 1:
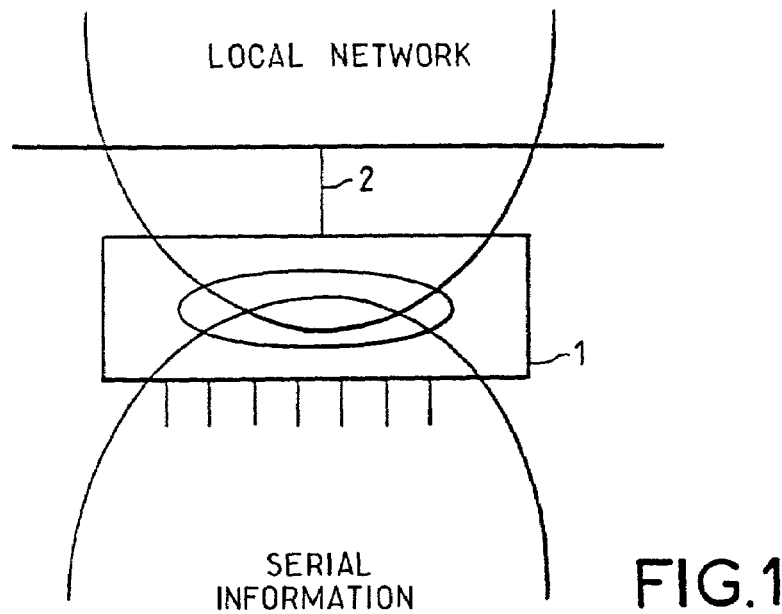
FIG. 1 illustrates the use of a data routing system in open mode.

FIG. 1 illustrates an example of use of a data routing system in open mode. A router 1 processes and routes data (radar data, for example) received via serial links to an Ethernet link of the UDP multicast type. This Ethernet link delivers the data treated by the router to a local information network, located for example in a flight control center.

Figure 2:
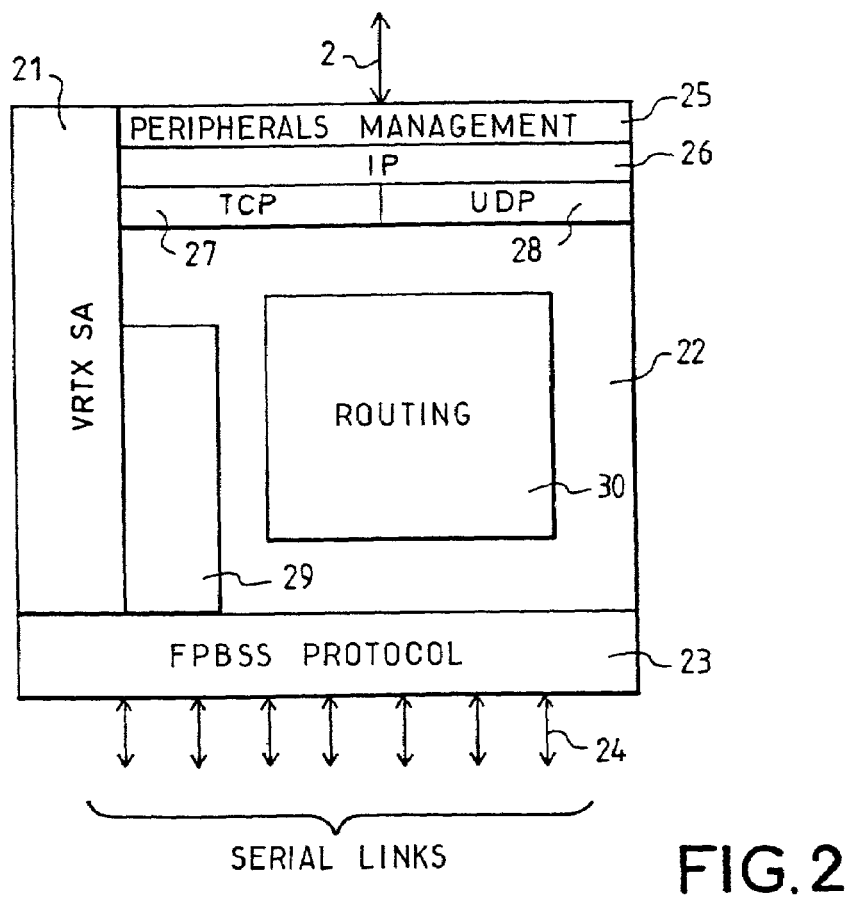
FIG. 2 illustrates the software architecture of a router according to FIG. 1.

FIG. 2 illustrates a possible software architecture for the router 1 operating in open mode as in FIG. 1. The router includes an operating system 21, for example of the VRTX SA type, which interacts with the various software layers: An intermediate software layer 22, referred to as "middleware", is added to the operating system 21 notably to provide services such as inter-task communication, time management or resource management. For this purpose, a library of service programs 29 is included in the intermediate layer. This layer 22 provides the link between the inputs/outputs software layers, the operating system and the application. A software layer 23 provides the link between the serial input links 24 and the intermediate layer 22. This input layer 23 makes use of, for example, FPBSS-type communication protocols. A series of software layers 25, 26, 27, 28 assures the link between the Ethernet link 2 and the intermediate software layer 22. An external layer 25 controls the output peripherals. Beneath this layer, the other software layers 26, 27, 28 handle different communication protocols for the output peripherals. A layer 26 executes the Internet communication protocol, called "IP". Two other software layers 27, 28, of higher level, execute the TCP and UDP communication protocols. The latter two layers 27, 28 communicate with the intermediate layer 22.

The intermediate layer 22 includes a specific interface application 30, which is in fact a routing program. This application provides a common interfacing enabling access to any input or output, whether it be of serial link or Ethernet type. This application notably issues requests to initialize or configure the inputs/outputs, for example to initialize a TCP/IP or X25 connection, and send or receive messages to or from the inputs/outputs according to a pre-defined routing program.

Figure 3:
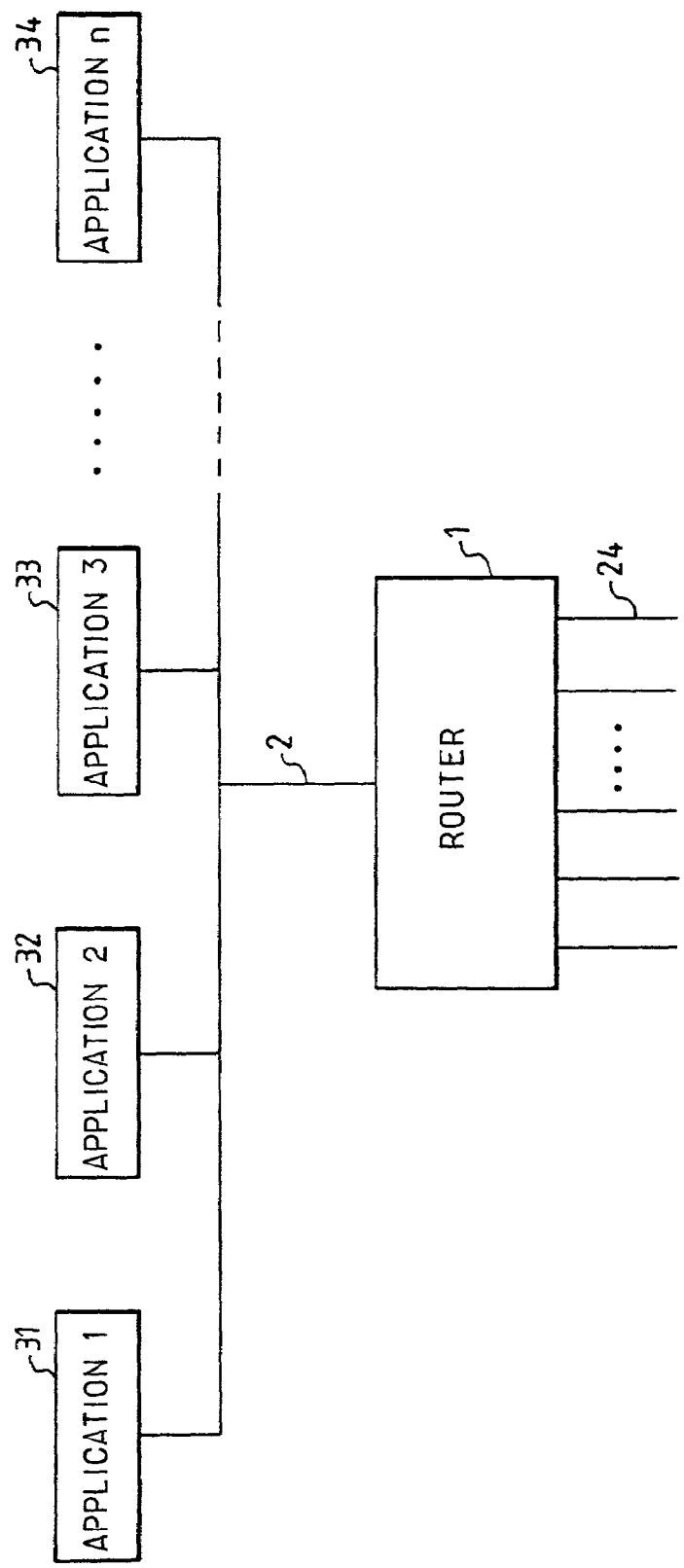
FIG. 3 shows a router connecting serial lines to applications.

FIG. 3 illustrates, by way of example, a router 1 linking serial lines 24 to applications 31, 32, 33, 34 via a link 2, for example of Ethernet type. For a given configuration, such as the one illustrated in FIG. 3, the router includes a pre-defined program routing 30. In the event of a modification—even a small evolution of the configuration—this routing program must be modified too. This is notably the case when a new input or output must be configured, for example an input carrying additional or very specific radar data using a non-standard protocol. The routing program 30 must also be revised when a specific additional routing must be activated, for example when an application is added or removed, or when a dedicated application is required, which could involve for example the removal of a checksum-type verification program for an asynchronous link. If we take the example of a configuration applied to air traffic control, the number of possible evolutions is very large. Developing a new routing program 30 for every evolution is not economic and would, in view of the potentially large number of evolutions, pose maintenance and reliability problems.

Figure 4:
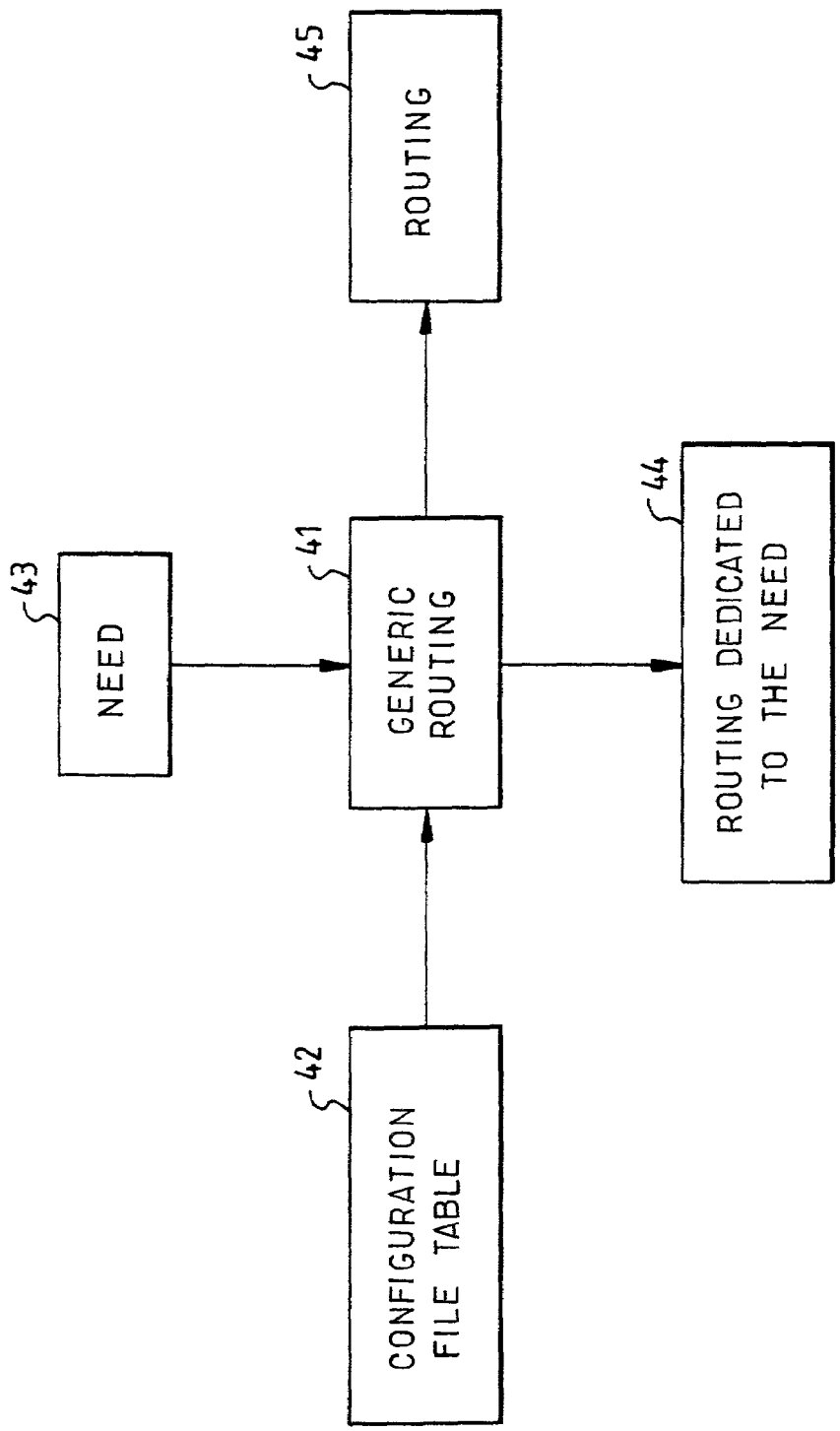
FIG. 4 is a block diagram illustrating the operating principle of a router according to the invention.

The block diagram in FIG. 4 illustrates the operating principle of a router according to the invention. Such a router includes a software component 41 that executes a generic routing program. This generic routing program is capable of handling all types of inputs and outputs; more particularly, it is preferably able to execute all the routings between the inputs and outputs. When the router starts, the generic router 41 reads a configuration file 42 previously loaded into a memory. This configuration file includes the parameters of a given set of routings, for example all the possible routings between the inputs and outputs. A routing defines a data path between an input and an output. Associated with the different routes programmed in the configuration file are input/output functions that the router can execute. Depending on the application need 43 and the configuration file 42, the generic router can execute a set of routing programs 30 specific to several needs, and even to a large number of needs.

More particularly, when the generic router starts (or after a reset), it initializes all the inputs and outputs dedicated to an application, in other words to a need, as defined by the configuration parameters. It activates in particular the inputs and outputs used for the application. It fills a routing table 45 from the configuration file. More precisely, the generic router loads a subset of routings, corresponding to a specific need, from the configuration file 42 to the routing table 45.

Once the initialization and configuration dedicated to the need are completed, the router waits to receive messages on the inputs. The router executes the routings between the inputs and outputs according to the configuration defined in the routing table. In particular, each message received by a given input is processed by a function associated with this input, then routed according to the routing table, then processed by a function associated with the selected output, then physically fed to this output. The figures that follow illustrate this operation.

Figure 5:
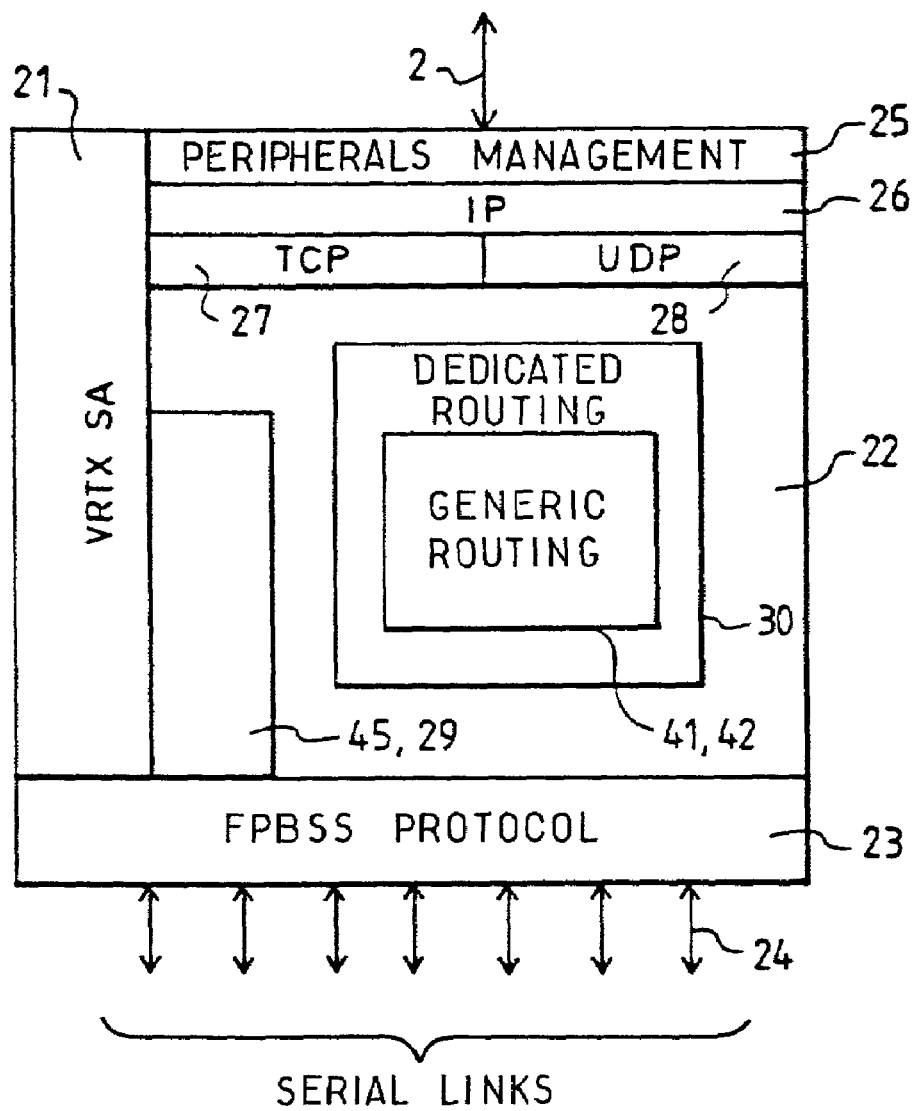
FIG. 5 illustrates the software architecture of a router according to the invention.

FIG. 5 illustrates an example of software architecture of a router according to the invention. The architecture is close to that of FIG. 2, but the dedicated routing program 30 executes the generic routing program 41, which interacts with the routing table 45 and the configuration file 42. The configuration file is for example stored in the services library 29. A given need 43 expresses the use of a set of inputs and outputs, and the use of the associated processing functions. For air traffic management, the inputs to activate are for example serial ports receiving radar, weather or flight plan data. The functions associated with these inputs process the messages according, for example, to their priorities, their validity or their pertinence. Therefore, associated with each specific need of an air traffic management application there is a definition of a set of inputs and outputs to activate, routings of these inputs to these outputs, and associated processing functions. This configuration is then loaded into the routing table 45 associated with the need. The generic router 41 is therefore an application that can cover a multitude of needs, and that can be configured to meet a given need, in fact a final application. For example, a router according to the invention can process about ten inputs and outputs; several routers can be used to handle a larger number of inputs and outputs.

Figure 6:
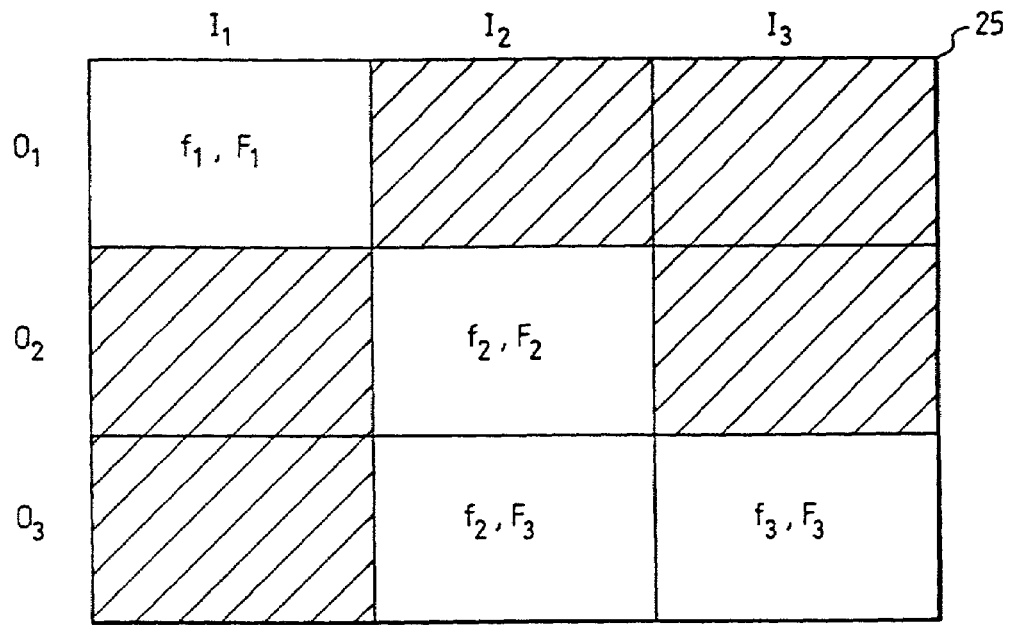
FIG. 6 shows an example of a routing table used by a router according to the invention.

FIG. 6 shows an example of a routing table 25 expressing the routings between three inputs $I_1, I_2, I_3$ and three outputs $O_1, O_2, O_3$. The routing table is accessed in two dimensions: $I_1, I_2, I_3$ correspond to the columns; $O_1, O_2, O_3$ correspond to the lines. The communication inputs to activate are for example serial links (X25, BSC, asynchronous, HDLC, "bit-stream" or other) with standard or customized parameters, for example the line speed, parity and electric characteristics. The outputs are for example Ethernet access points such as UDP or TCP outputs, Internet addresses, and port numbers.

The cross-hatched cells in the table indicate that there is no link between the corresponding input and output. The table in FIG. 6 therefore defines the following routes:

Route 1=Input $I_1$ to output $O_1$;
Route 2=Input $I_2$ to output $O_2$;
Route 3=Input $I_2$ to output $O_3$;
Route 4=Input $I_3$ to output $O_3$.

For the route 1, a function $f_1$ is assigned to input $I_1$ and a function $F_1$ is assigned to output $O_1$. Similarly, functions $f_2$, $F_2$, $f_3$, $F_3$ are respectively assigned to the inputs/outputs $I_2$, $O_2$, $I_3$, $O_3$. These functions could be for example data integrity checking functions, sorting functions, or message management functions. In the latter case, the functions manage for example message priorities. All other types of processing functions are possible. The same function can be assigned to several inputs or outputs: for example, function $f_2$ could be identical to function $f_3$.

Figure 7:
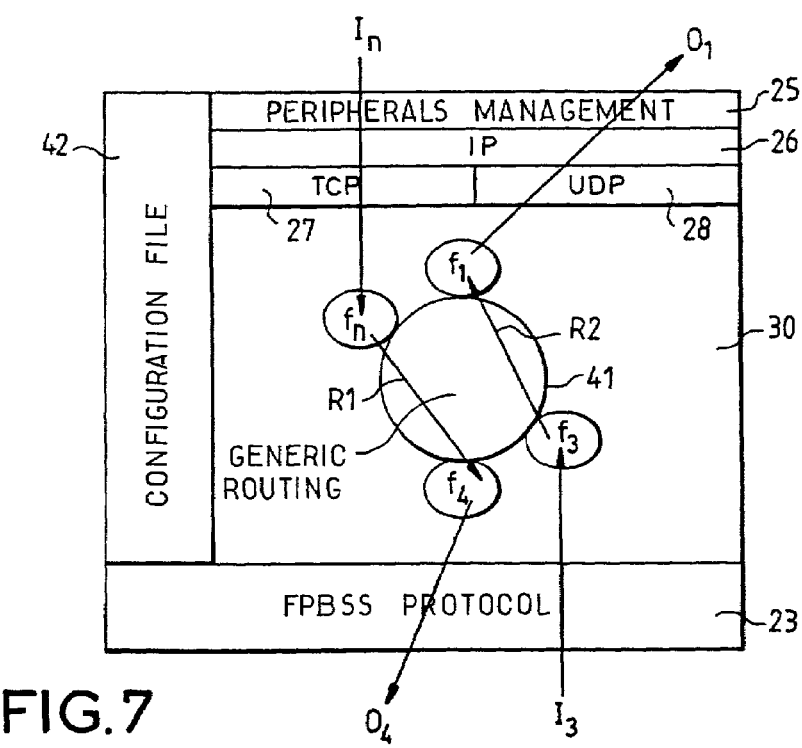
FIG. 7 shows another embodiment of a router according to the invention, highlighting an example of routes and their associated functions.

FIG. 7 illustrates a different embodiment of a router according to the invention in the case where the router handles for example two simple routes, the operating system 21 and the intermediate software are not shown in the figure. The generic router 41 can for example potentially handle N inputs $I_1, I_2, \ldots I_N$ and M outputs $O_1, O_2, \ldots O_M$, with p associated functions $f_1, f_2, \ldots f_P$. In the embodiment shown in FIG. 7, only the inputs $I_3$ and $I_n$ and the outputs $O_1$ and $O_4$ are activated.

Therefore a first route $R_1$ connects a TCP/IP connection $I_n$ whose processing function is $f_n$ to a serial output $O_4$ whose processing function is $f_4$. A second route $R_2$ connects a serial input $I_3$ whose processing function is $f_3$ to an UDP access point $O_1$ whose processing function is $f_1$. These two routes $R_1$, $R_2$ and the associated functions $f_1, f_3, f_4, f_n$ are defined by the routing table which is loaded from the configuration file 42 according to the final application or need.

A router according to the invention can include functions dedicated to handling processing capacity overloads, referred to as "overflows". An overflow can occur, for example, when too many messages are received on a given input and are routed to the same output, in particular when the output line speed is less than the input line speed or when flow control is active on one of the connections. An overflow handling function notably includes a decision on the transmission and priority of queued messages. According to the invention, several overflow handling functions can be defined according to the circumstances. A function $F_{ov}$, hereinafter called the overflow function, is for example defined for each route $R_z$ by the following relation:

$$R_z = (\text{input } I_x \text{ to output } O_y) \times F_{ov} \qquad (1)$$

For the route $R_z$ the function $F_{ov}$ defines the management of the overflow situation of the messages transiting this route. A first function $F_{ov}$ is adapted for the handling of incoming messages routed according to a given sequence, for example the message numbers. In the event of overflow, the last messages received are rejected until the overflow situation is resolved. In other words, the function $F_{ov}$ gives priority to messages in the order of their sequential number, without loss of messages within the routed sequence. Therefore, if a sequence includes five messages $m_1, m_2, m_3, m_4, m_5$, $F_{ov}$ prevents the routing of message $m_5$ to the output as long as $m_4$ has not been sent. In this example, it is not the time of arrival of the messages which is the most important, but rather the sequential, complete and/or exhaustive aspect of the message. In this sequential mode, the function $F_{ov}$ either sends the messages on the route $R_z$ or rejects them. This type of function $F_{ov}$ is for example used for routing flight plan information in air traffic management systems; such transmissions are generated when an aircraft is handed over from one traffic control center to another.

A second possible overflow processing function is more suitable for the handling of more vital information, such as radar data. For example, radar tracking systems can anticipate or extrapolate target positions. To do this, it is preferable to have the most recent position data of an aircraft if the extrapolated position is to be correctly calculated; it may be pointless to send older data, which can therefore be discarded; in any event, such data are no longer valid after a given period of time. In the event of overflow, the function $F_{ov}$ rejects the oldest data received in favor of the most recent data, which are routed on the route $R_z$. When the data received are radar data, the most recent data effectively represent the current radar coverage.

A third possible overflow function performs a flow control. This function can be used advantageously for example for TCP/IP or X25 communication protocols. If an output is in an overflow situation, the corresponding input(s) are blocked until the overflow is resolved. This notably enables the flow of data into the router to be controlled. In other words, when too many messages are reaching an output, the function $F_{ov}$ reduces the data flow on the route $R_z$. More precisely, it sends a message to the data source requesting it to stop transmission of messages, to enable the overloaded output to clear its queue of waiting messages.

The overflow functions $F_{ov}$ can be combined with the functions $f_1, f_2 \ldots$ associated with the inputs and outputs. They are defined in the configuration file 42 and loaded into the routing table when needed.

A router according to the invention is cost-effective, since it can satisfy many needs with very few software modifications or evolutions from one need to another. In particular, the generic router 41 and the configuration file 42 can stay the same. Only the intermediate software 22, referred to as "middleware", must be modified, notably to take into account the parameters defining the precise need.

A router according to the invention can be used in a modular configuration. For example, it is then possible to use one or more routers dedicated to routing of radar data, a router dedicated to flight plan data, another router dedicated to meteorological data, and possibly other routers assigned to other types of data.

The router according to the invention has been described for an air traffic management application. It will be evident to professionals of the art that the invention is also an economically advantageous solution applicable to other types of applications involving data routing. In particular, numerous types of data can be routed in a router according to the invention, with their associated protocols which can be standard or customized.

What is claimed is:

1. A network router comprising:
   at least one generic router configured to route data between input devices and output devices;
   a memory unit configured to store a configuration file including a given set of routings between said input devices and output devices; and
   said memory unit further configured to store a routing table, wherein the generic router is further configured to load a subset of the given set of routings from said configuration file into said routing table and to execute routings between said input devices and output devices according to the routings loaded into said routing table.

2. The network router according to the claim 1, wherein said subset of routings is specific to a given need.

3. The network router according to the claim 2, wherein said generic router is configured to activate said input devices and output devices dedicated to an application at start-up and to load said routing table at start-up.

4. The network router according to any one of the preceding claims, wherein data processing functions are associated with said subset of routings, these functions being defined in said configuration file and loaded into said routing table.

5. The network router according to the claim 4, wherein a message received by a given input device is processed by a first function associated with the input device, then routed according to said routing table to a designated output device, then processed by a second function associated with the output device.

6. The network router as in any one of claims 1, 2, and 3, further comprising:
   an operating system;
   input and output software layers; and
   an intermediate software layer providing a link between said operating system, said input and output layers, and said generic router.

7. The network router as in any one of claims 1, 2, and 3, wherein said input devices and output devices are connected to one of a serial X25 link, BSC link, asynchronous link, HDLC link, UDP Ethernet link, and TCP Ethernet link.

8. The network router as in any one of claim 1, 2, and 3, wherein messages received by the generic router are routed in a given sequence, and said generic router includes a function dedicated to capacity overflow management, the function rejects recently received messages until the overflow situation is resolved, in order that the messages are routed in their sequential order without loss of any message within a routed sequence.

9. The network router as in any one of claims 1, 2, and 3, wherein the generic router includes a function dedicated to capacity overflow management, the function rejects older data in favor of recent data, and the recent data is routed to the output device.

10. The network router as in any one of claims 1, 2, and 3, wherein the generic router includes a function dedicated to capacity overflow management, the function reduces data rate on the route and sends a message to a data source requesting the data source to stop sending messages to enable an overflow situation to be resolved.

11. The network router as in any one of claims 1, 2, and 3, wherein said routed data relates to an air traffic control application.

12. The network router as in any one of claims 1, 2, and 3, wherein said routed data is radar data.

13. The network router as in any one of claims 1, 2, and 3, wherein said routed data is meteorological data.

14. The network router as in any one of claims 1, 2, and 3, wherein said routed data is flight plan data.

15. A method of routing data comprising steps of:
   routing data between input devices and output devices;
   storing a configuration file including a given set of routings between said input devices and output devices;
   loading a subset of the given set of routings from the configuration file into a routing table; and
   executing routings between said input devices and output devices according to the routings loaded into said routing table.

* * * * *